US006853612B2

(12) United States Patent
Lee

(10) Patent No.: US 6,853,612 B2
(45) Date of Patent: Feb. 8, 2005

(54) DIGITAL MODULATION APPARATUS USED WITH DVD-RAM AND DVD-R/RW FOR INCREASING MARGIN OF OPERATION OF EXTERNAL DEVICE AND METHOD THEREOF

(75) Inventor: Tae-ho Lee, Gyeongju-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 494 days.

(21) Appl. No.: 10/108,622

(22) Filed: Mar. 29, 2002

(65) Prior Publication Data

US 2003/0012111 A1 Jan. 16, 2003

(30) Foreign Application Priority Data

Jul. 16, 2001 (KR) ......................................... 2001-42819

(51) Int. Cl.[7] ................................................ G11B 5/76
(52) U.S. Cl. .................................. 369/59.23; 369/53.31
(58) Field of Search .......................... 369/47.19, 53.31, 369/53.44, 59.13, 59.23, 59.24, 124.04; 360/40, 41; 341/59, 68

(56) References Cited

U.S. PATENT DOCUMENTS

| 5,734,787 | A | * | 3/1998 | Yonemitsu et al. | .......... | 386/111 |
| 6,348,883 | B2 | * | 2/2002 | Okada et al. | .................. | 341/59 |
| RE38,481 | E | * | 3/2004 | Yonemitsu et al. | ....... | 369/275.3 |

FOREIGN PATENT DOCUMENTS

JP 9-162744 A 6/1997
JP 10-312643 A 11/1998

* cited by examiner

Primary Examiner—Paul W. Huber
(74) Attorney, Agent, or Firm—Sughrue Mion, PLLC

(57) ABSTRACT

A digital modulation apparatus and method used for a DVD-RAM and a DVD-R/RW and for increasing the margin of an operation of an external device is provided. The digital modulation apparatus includes a 4-stage pipeline and includes a mode selection unit, a field enabling signal generation unit, a data fetch and sync code generating unit, an eight-to-fourteen modulation plus (EFMplus) conversion unit, and a non-return-to-zero inverted (NRZI) conversion unit. The mode selection unit generates a mode selection signal for selecting one from a DVD-RAM operation mode and a DVD-R/RW operation mode in response to a control signal. The field enabling signal generation unit selectively generates recording field enabling signals related to a DVD-RAM, or selectively generates recording field enabling signals related to a DVD-R/RW, in response to a start signal and the mode selection signal and provides the recording field enabling signals to the data fetch and sync code generation unit. The data fetch and sync code generation unit fetches 8-bit data words, generates sync codes, and performs an operation for fetching the data words and an operation for generating first sync codes in parallel. The EFMplus conversion unit converts the 8-bit data words output from the data fetch and sync code generation unit into M-bit (where M is an integer) first code words and then, converts the converted first code words into 16-bit second code words. The NRZI conversion unit converts the second code words into a NRZI signal.

9 Claims, 5 Drawing Sheets

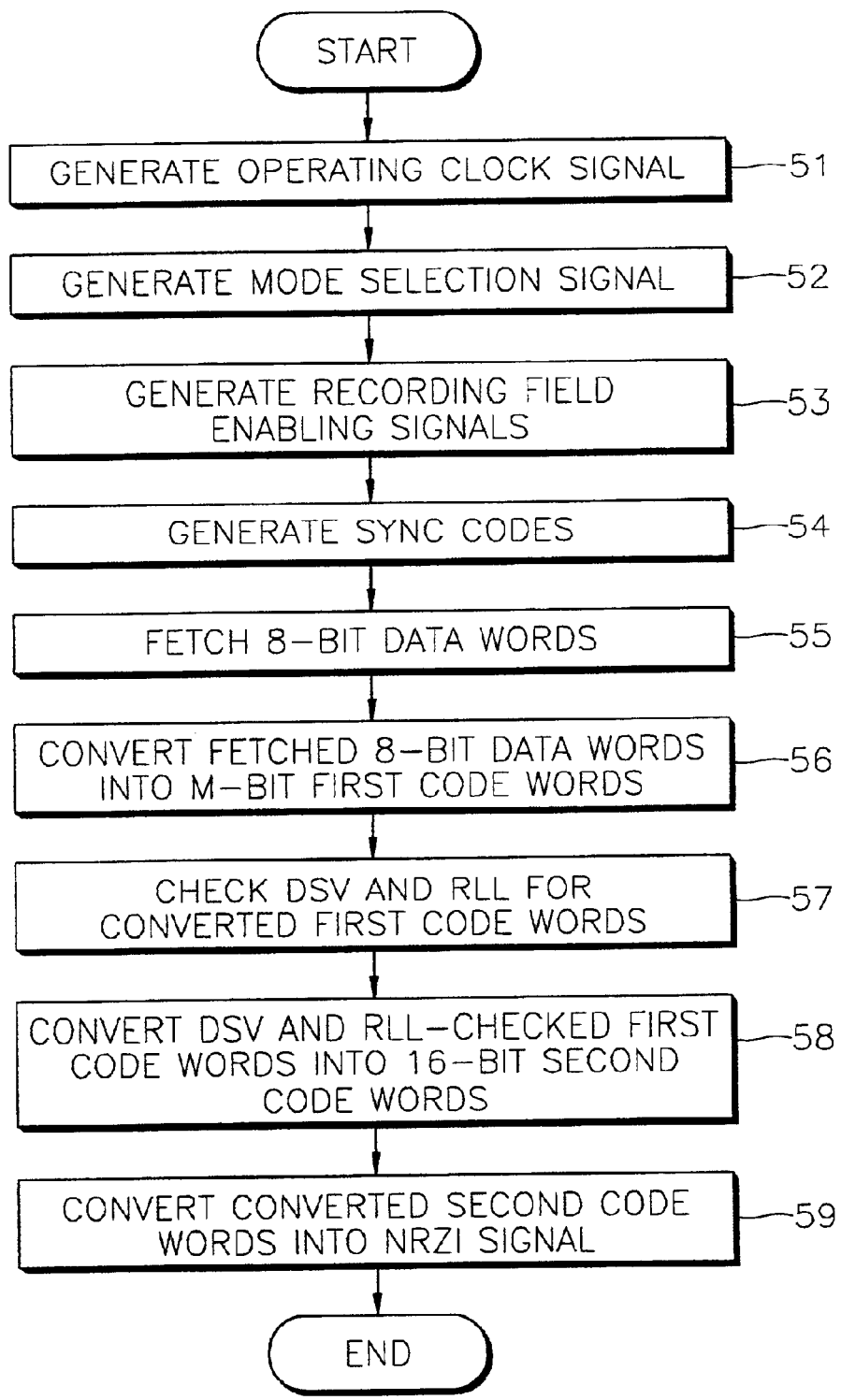

DIGITAL MODULATION APPARATUS USED WITH DVD-RAM AND DVD-R/RW FOR INCREASING MARGIN OF OPERATION OF EXTERNAL DEVICE AND METHOD THEREOF

BACKGROUND OF THE INVENTION

1. Field of the Invention

The present invention relates to a digital video disc-random access memory (DVD-RAM) and a digital video disc-recordable/rewritable (DVD-R/RW), and more particularly, to a digital modulation apparatus used with a DVD-RAM and a DVD-R/RW and a method thereof. The present application is based on Korean Patent Application 2001-42819, filed Jul. 16, 2001, which is incorporated herein by reference.

2. Description of the Related Art

A digital modulation and demodulation apparatus is used to record data on optical disc media such as DVD-RAMs and DVD-R/RWs, or to reproduce data from an optical disc media. As shown in FIG. 1, a conventional digital modulation and demodulation apparatus includes a modulation unit 11 for modulating user data, that is, data words D(i) (where i is an integer), into a non-return-to-zero inverted (NRZI) signal $S_{NRZI}$, an optical head 13 for writing a NRZI signal $S_{NRZI}$ to an optical disc 17 and reading the NRZI signal $S_{NRZI}$ from the optical disc 17, and a demodulation unit 15 for demodulating the NRZI signal $S_{NRZI}$ read from the optical disc 17 into original data words D(i).

In particular, in the modulation unit 11, the data words D(i) are converted by a code converter 11a into code words C(i), and the converted code words C(i) are converted by a NRZI converter 11b into the NRZI signal $S_{NRZI}$. Eight-to-fourteen modulation (EFM) conversion, or eight-to-fourteen modulation plus (EFMplus) conversion is used to convert the data words D(i) into the code words C(i) through the code converter 11a. EFMplus conversion is an improved EFM conversion method for high-density recording and improving performance.

In the demodulation unit 15, the NRZI signal $S_{NRZI}$, read from the optical disc 17, is converted by a reversed NRZI converter 15a into the code words C(i), and the reversed-converted code words C(i) are reversed-converted by a reversed code converter 15b into the original data words D(i).

FIG. 2 is a detailed block diagram of a modulation unit shown in FIG. 1. Here, a case where the EFMplus conversion method is used is shown.

Referring to FIG. 2, the modulation unit 11 includes a data fetch and sync code generation unit 21, an EFMplus converter 23, a NRZI converter 25, and a first-in first-out (FIFO) buffer 27.

The data fetch and sync code generation unit 21 fetches input user data, that is, 8-bit data words D(7:0), generates 16-bit sync codes S(15:0) and outputs the 8-bit data words D(7:0) and the 16-bit sync codes S(15:0).

The EFMplus converter 23 receives the 8-bit data words D(7:0) and the 16-bit sync codes S(15:0), performs eight-to-sixteen modulation (ESM), checks a digital sum value (DSV) and runlength limits (RLL) and outputs 16 bit-converted code words C(15:0). The NRZI converter 25 converts the 16 bit-converted code words C(15:0) into the NRZI signal $S'_{NRZI}$. The NRZI signal $S_{NRZI}$ is output as 1-bit serial data $S'_{NRZI}$ through the FIFO 27.

However, in the conventional modulation apparatus shown in FIG. 2, data processing is sequentially performed, and thus, internal delay may increase. In this case, the margin of an operation of external devices such as a write strategy control (WSC) apparatus and an optical pick-up apparatus, may not be enough. Further, in the conventional modulation apparatus, the 8-bit data words D(7:0) are directly converted into the 16-bit code words C(15:0), and thus, the size of the conventional modulation apparatus may increase in a case where the conventional modulation apparatus is implemented with integrated circuits. Further, the conventional modulation apparatus is constituted to be used only for one of a DVD-RAM and a DVD-R/RW.

SUMMARY OF THE INVENTION

To solve the above problems, it is a first object of the present invention to provide a digital modulation apparatus which is capable of increasing the margin of an operation of an external device such as a WSC device and an optical pick-up, and of being used for a DVD-RAM and a DVD-R/RW, the size of the digital modulation apparatus decreasing when the apparatus is implemented with integrated circuits.

It is a second object of the present invention to provide a digital modulation method which is capable of increasing the margin of an operation of an external device such as a WSC device and an optical pick-up, and of being used for a DVD-RAM and a DVD-R/RW, the size of the digital modulation apparatus decreasing when the apparatus is implemented with integrated circuits.

Accordingly, to achieve the first object, there is provided a digital modulation apparatus. The digital modulation apparatus includes a data fetch and sync code generation unit for fetching 8-bit data words, generating sync codes, and performing an operation for fetching the data words and an operation for generating first sync codes in parallel, an eight-to-fourteen modulation plus (EFMplus) conversion unit for converting the 8-bit data words output from the data fetch and sync codes generation unit into M-bit (where M is an integer) first code words and then converting the converted first code words into 16-bit second code words, and a non-return-to-zero inverted (NRZI) conversion unit for converting the second code words into a NRZI signal.

It is preferable that the apparatus further includes a mode selection unit for generating a mode selection signal for selecting one from a DVD-RAM operation mode and a DVD-R/RW operation mode in response to a control signal, and a field enabling signal generation unit for selectively generating recording field enabling signals related to a DVD-RAM, or recording field enabling signals related to a DVD-R/RW in response to a start signal and the mode selection signal and providing the recording field enabling signals to the data fetch and sync code generation unit.

It is also preferable that the apparatus further includes a test pattern generation unit for generating a test pattern for testing external devices such as a write strategy control (WSC) device and an optical pick-up device, in response to a test enabling signal.

It is also preferable that the EFMplus conversion unit includes a first code conversion unit, a digital sum value (DSV) and runlength limits (RLL) controller, and a second code conversion unit. The first code conversion unit converts the 8-bit data words into the M-bit first code words. The digital sum value (DSV) and runlength limits (RLL) controller receives the sync codes and the converted first code words and checks the DSV and the RLL. The second code conversion unit converts output code words of the DSV and RLL controller into the 16-bit second code words in response to the sync codes.

It is also preferable that the digital modulation apparatus includes a 4-stage pipeline. That is, the data fetch and sync code generation unit operates during a first cycle of an operating clock signal which is obtained by dividing a predetermined write clock signal by four, the first code conversion unit operates during a second cycle of the operating clock signal, the DSV and RLL controller operates during a third cycle of the operating clock signal, and the second code conversion unit and the NRZI conversion unit operate during a fourth cycle of the operating clock signal.

In order to achieve the second object, there is provided a digital modulation method. The digital modulation method includes the steps of generating sync codes in response to recording field enabling signals, fetching 8-bit data words during a first cycle of an operating clock signal while first sync codes of the sync codes are generated, in response to the recording field enabling signals, converting the fetched data words into M-bit first code words during a second cycle of the operating clock signal, checking a digital sum value (DSV) and runlength limits (RLL) for the converted first code words during a third cycle of the operating clock signal, and converting the checked first code words into 16-bit second code words and converting the converted second code words into a non-return-to-zero inverted (NRZI) signal during a fourth cycle of the operating clock signal.

It is preferable that before generating sync codes, the method further includes the steps of generating the operating clock signal which is obtained by dividing a write clock signal by four, generating a mode selection signal for selecting one from a DVD-RAM operation mode and a DVD-R/RW operation mode in response to a control signal, and selectively generating recording field enabling signals related to a DVD-RAM, or selectively generating recording field enabling signals related to a DVD-R/RW in response to a start signal and the mode selection signal.

BRIEF DESCRIPTION OF THE DRAWINGS

The above objects and advantages of the present invention will become more apparent by describing in detail a preferred embodiment thereof with reference to the attached drawings in which:

FIG. 5 is a flow chart illustrating a digital modulation method according to an embodiment of the present invention.

DETAILED DESCRIPTION OF THE INVENTION

Figure 1:
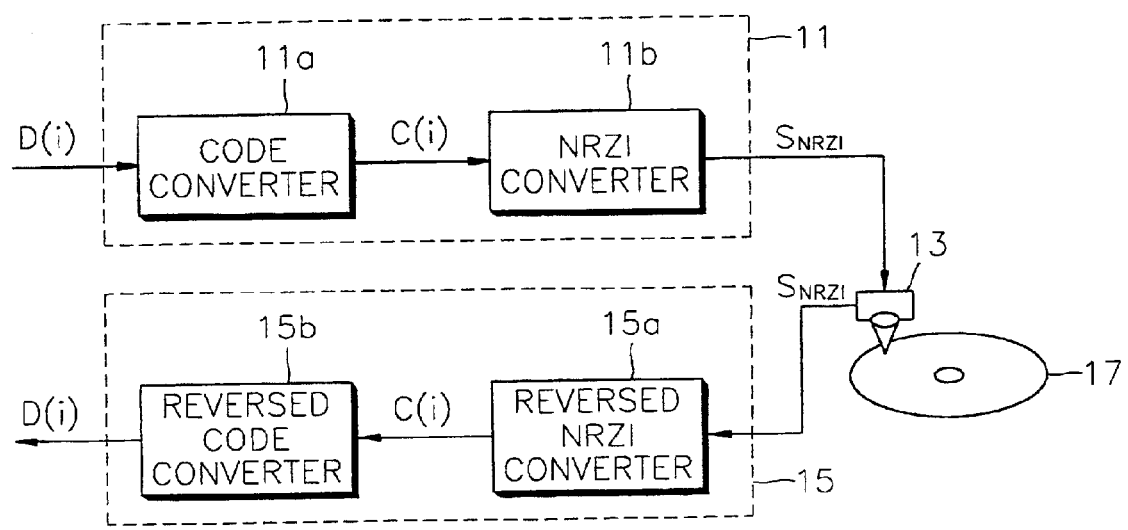
FIG. 1 is a block diagram of a conventional digital modulation and demodulation apparatus.
Figure 2:
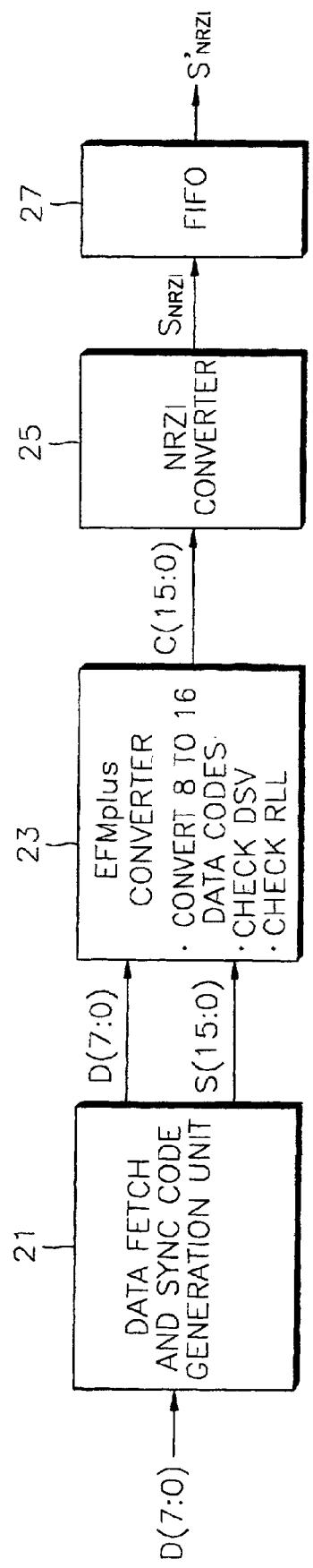
FIG. 2 is a detailed block diagram of the modulation unit shown in FIG. 1.

Hereinafter, the present invention will be described in detail with reference to the accompanying drawings. Like reference numerals refer to like elements throughout the drawings.

Figure 3:
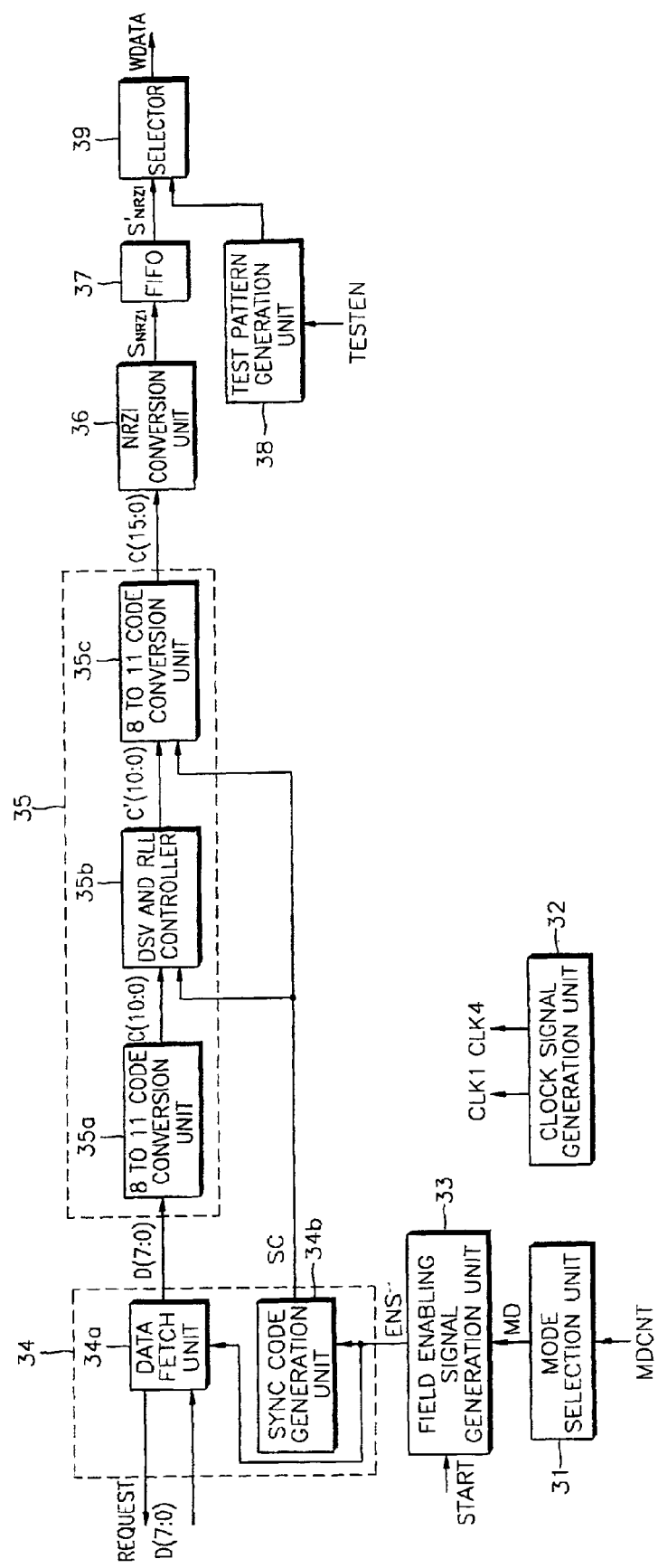
FIG. 3 is a block diagram of a digital modulation apparatus according to an embodiment of the present invention.

FIG. 3 is a block diagram of a digital modulation apparatus according to an embodiment of the present invention.

Referring to FIG. 3, the digital modulation apparatus according to an embodiment of the present invention includes a mode selection unit 31, a clock signal generation unit 32, a field enabling signal generation unit 33, a data fetch and sync code generation unit 34, an eight-to-fourteen-modulation plus (EFMplus) conversion unit 35, a non-return-to-zero inverted (NRZI) conversion unit 36, a first-in first-out (FIFO) memory 37, a test pattern generation unit 38, and a selector 39.

The mode selection unit 31 generates a mode selection signal MD for selecting one from a DVD-RAM operation mode and a DVD-R/RW operation mode in response to a control signal MDCNT. For example, the digital modulation apparatus operates in a DVD-RAM operation mode when the mode selection signal MD is in a first logic state, and the digital modulation apparatus operates in a DVD-R/RW operation mode when the mode selection signal MD is in a second logic state.

The field enabling signal generation unit 33 selectively generates recording field enabling signals ENS related to a DVD-RAM, or recording field enabling signals related to DVD-R/RW in response to a start signal START and the mode selection signal MD and provides the recording field enabling signals ENS to the data fetch and sync code generation unit 34. Here, the structure of a recording field related to a DVD-RAM and the structure of a recording field related to a DVD-R/RW are well known to people skilled in the art, and detailed descriptions thereof will be omitted.

More specifically, when the start signal START is activated and the mode selection signal MD is in the first logic state, the recording field enabling signals related to a DVD-RAM are generated by the field enabling signal generation unit 33 and are provided to the data fetch and sync code generation unit 34. Thus, in this case, the data fetch and sync code generation unit 34 operates in a DVD-RAM operation mode. On the other hand, when the start signal START is activated and the mode selection signal MD is in the second logic state, the recording field enabling signals related to a DVD-R/RW are generated by the field enabling signal generation unit 33 and are provided to the data fetch and sync code generation unit 34. Thus, in this case, the data fetch and sync code generation unit 34 operates in a DVD-R/RW operation mode.

The data fetch and sync code generation unit 34 fetches user data, that is, 8-bit data words D(7:0), in response to the recording field enabling signals ENS, outputs the fetched data words and generates sync codes SC. In particular, the data fetch and sync code generation unit 34 performs an operation for fetching the 8-bit data words D(7:0) and an operation for generating a first sync code SC in parallel so as to reduce internal delay. In other words, the data fetch and sync code generation unit 34 fetches the 8-bit data words D(7:0) while the first sync code SC is output and outputs the fetched data words.

The data fetch and sync code generation unit 34 includes a data fetch unit 34a and a sync code generation unit 34b. The data fetch unit 34a fetches the 8-bit data words D(7:0) by using a request signal REQUEST in response to the recording field enabling signals ENS and outputs the fetched data words D(7:0). The sync code generation unit 34b generates the first sync code SC in response to the recording field enabling signals ENS.

The EFMplus conversion unit 35 includes an 8 to 11 code conversion unit 35a, a DSV and RLL controller 35b, and an 11 to 16 code conversion unit 35c. The 8 to 11 code conversion unit 35a converts fetched 8-bit data words D(7:0) into 11-bit first code words C(10:0). The 8 to 11 code conversion unit 35a includes an 8 to 11 conversion table and a code word generation circuit.

The DSV and RLL controller 35b receives the first sync code SC and the 11-bit first code words C(0:0) and checks a digital sum value (DSV) and runlength limits (RLL). The DSV and RLL are well known to people skilled in the art, and detailed descriptions thereof will be omitted. The 11 to 16 conversion unit 35c converts output code words C'(10:0) of the DSV and RLL controller 35b into 16-bit second code words C(15:0) in response to the first sync code SC. The 11 to 16 code conversion unit 35c includes an 11 to 16 conversion table and a code word generation circuit.

As described above, the EFMplus conversion unit 35 does not directly convert 8-bit data words D(7:0) into the 16-bit code words C(15:0) like in the prior art but converts the 8-bit data words D(7:0) into the 11-bit first code words C(10:0), then converts the 11-bit first code words C(10:0) into the 16-bit second code words C(15:0). Accordingly, elements of the EFMplus conversion unit 35, that is, circuits of the 8 to 11 code conversion unit 35a, the DSV and RLL controller 35b, and the 11 to 16 code conversion unit 35c, become more simplified, and thus, the size of the circuits decreases in a case where the circuits are implemented with integrated circuits.

The NRZI conversion unit 36 converts a second code word C(15:0) into a non-return-to-zero inverted (NRZI) signal $S_{NRZI}$, and the NRZI signal $S_{NRZI}$ is output as 1-bit serial data $S'_{NRZI}$ through the FIFO memory 37.

Figure 4:
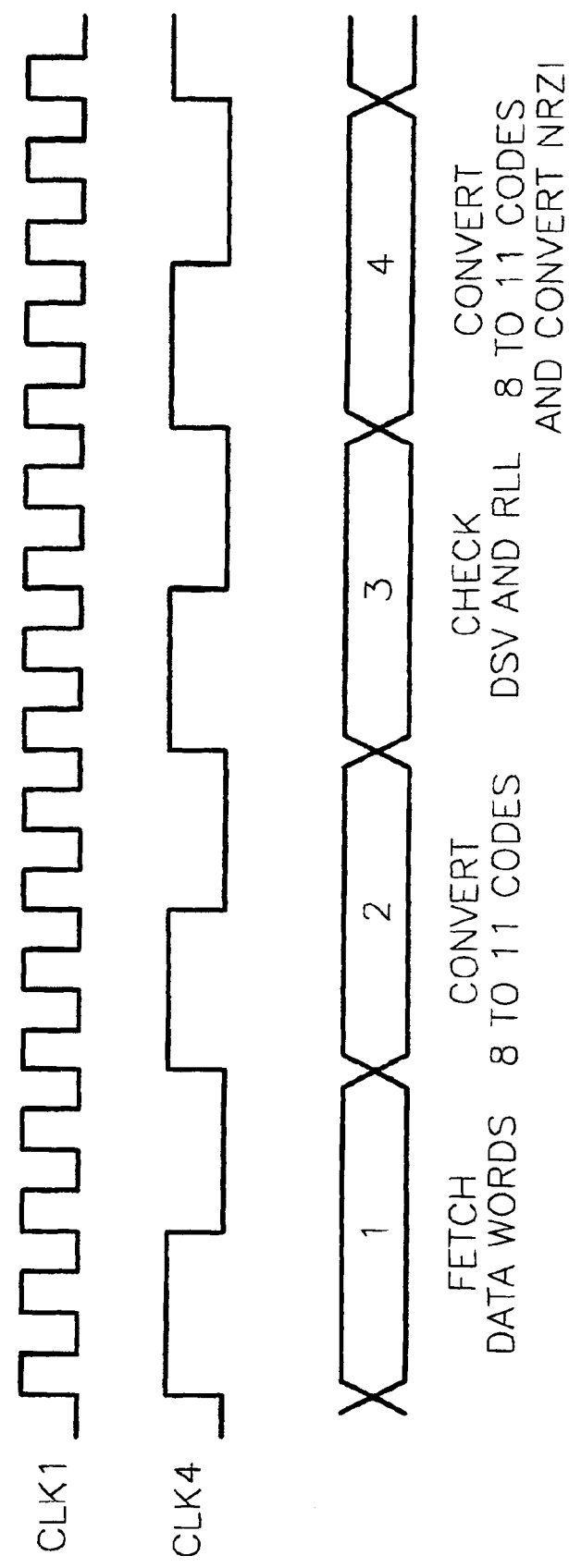
FIG. 4 is a timing diagram of the digital modulation apparatus shown in FIG. 3.

In particular, the digital modulation apparatus includes a 4-stage pipeline. In other words, as shown in FIG. 4, the data fetch unit 34a fetches the 8-bit data words D(7:0) during a first cycle of an operating clock signal CLK4, and the 8 to 11 code conversion unit 35a converts the fetched 8-bit data words into the 11-bit first code words C(10:0) during a second cycle of the operating clock signal CLK4. The DSV and RLL controller 35b checks the DSV and RLL for the first code words C(10:0) during a third cycle of the operating clock signal CLK4, and the 11 to 16 code conversion unit 35c converts the DSV and RLL-checked first code words C'(10:0) into the 16-bit second code words C(15:0) during a fourth cycle of the operating clock signal CLK4, and also the NRZI conversion unit 36 converts the second code words C(15:0) into the NRZI signal $S_{NRZI}$ during the fourth cycle of the operating clock signal CLK4.

The operating clock signal CLK4 is generated by the clock signal generation unit 32 and is a clock signal in which a write clock signal CLK1 corresponding to a basic operating clock signal is divided by four.

As described above, the digital modulation apparatus includes a 4-stage pipeline. The data fetch and sync code generation unit 34 performs an operation for fetching the data words D(7:0) and an operation for generating a first sync code SC in parallel, thereby reducing internal delay. Further, the FIFO memory 37 is divided into two buffer blocks, thereby further reducing internal delay. Thus, internal delay in the digital modulation apparatus is reduced compared to the prior art, thereby increasing the margin of an operation of an external device such as a write strategy control (WSC) device and an optical pick-up device.

Meanwhile, the test pattern generation unit 38 generates a test pattern for testing an external device such as a WSC device and an optical pick-up device, in response to a test enabling signal TESTEN applied from an external pin. That is, the test pattern generation unit 38 generates fixed test patterns, that is, a NRZI data pattern and a sync code pattern according to values set in an external micro-controller (MCU) and outputs the NRZI data pattern and the sync code pattern to an external device such as a WSC device or an optical pick-up device, through the selector 39.

The following three methods are used to generate test patterns in the test pattern generation unit 38. In a first method, the test pattern generation unit 38 generates a sync code pattern in a sync field and receives test patterns set in the micro-controller (MCU) from other fields and outputs the received test patterns to the selector 39. In such a case, a predetermined fixed pattern must be inserted between the sync code pattern and the test patterns set in the MCU so as not to disobey the RLL.

In a second method, the test pattern generation unit 38 receives test patterns set in the MCU regardless of the sync field and outputs the received test patterns to the selector 39. In a third method, the test pattern generation unit 38 generates test patterns without field classification and outputs the generated test patterns to the selector 39.

Thus, the operation of an external device such as a WSC device or an optical pick-up device, may be easily tested by the test pattern generation unit 38, thereby improving testability.

FIG. 5 is a flow chart illustrating a digital modulation method according to an embodiment of the present invention, and the digital modulation apparatus shown in FIG. 3 operates according to the digital modulation method. Hereinafter, the digital modulation method according to an embodiment of the present invention will be described with reference to FIGS. 3 and 5.

Referring to FIG. 5, the digital modulation method according to an embodiment of the present invention includes nine steps (step 51 through 59). An operating clock signal CLK4 which is obtained by dividing the write clock signal CLK1 by four is generated in step 51. Next, a mode selection signal MD for selecting one from a DVD-RAM operation mode and a DVD-R/RW operation mode is generated in response to a control signal MDCNT in step 52. Next, signals related to a DVD-RAM, or signals related to a DVD-R/RW among recording field enabling signals ENS are selectively generated in response to a start signal START and the mode selection signal MD in step 53.

Next, sync codes SC are generated in response to the recording field enabling signals ENS in step 54. Next, 8-bit data words D(7:0) are fetched during a first cycle of the operating clock signal CLK4 while a first sync code of the sync codes SC is generated, in response to the recording field enabling signals ENS in step 55 by using the request signal REQUEST. Next, the fetched 8-bit data words D(7:0) are converted into 11-bit first code words C(10:0) during a second cycle of the operating clock signal CLK4 in step 56.

Next, a digital sum value (DSV) and runlength limits (RLL) for the converted first code words C(10:0) are checked during a third cycle of the operating clock signal CLK4 in step 57. Next, a DSV and RLL-checked first code words C'(10:0) is converted into a 16-bit second code words C(15:0) during a fourth cycle of the operating clock signal CLK4 in step 58, and also the converted second code words C(15:0) are converted into a NRZI signal $S_{NRZI}$ during the fourth cycle of the operating clock signal CLK4 in step 59.

As described above, the digital modulation apparatus and method according to the present invention can increase the margin of an operation of an external device such as a WSC device and an optical pick-up device, and the size of the digital modulation apparatus decreases in a case where the digital modulation apparatus is implemented by integrated circuits, and the digital modulation apparatus can be used for a DVD-RAM and a DVD-R/RW.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A digital modulation apparatus comprising:
   a data fetch and sync code generation unit for fetching 8-bit data words;
   an eight-to-fourteen modulation plus (EFMplus) conversion unit for converting the 8-bit data words output from the data fetch and sync code generation unit into M-bit (where M is an integer) first code words and then converting the converted first code words into 16-bit second code words; and
   a non-return-to-zero inverted (NRZI) conversion unit for converting the second code words into a NRZI signal.

2. The apparatus of claim 1, further comprising:
   a mode selection unit for generating a mode selection signal for selecting one from a DVD-RAM operation mode and a DVD-R/RW operation mode in response to a control signal; and
   a field enabling signal generation unit for selectively generating recording field enabling signals related to a DVD-RAM, or recording field enabling signals related to a DVD-R/RW in response to a start signal and the mode selection signal and providing the recording field enabling signals to the data fetch and sync code generation unit.

3. The apparatus of claim 2, further comprising a test pattern generation unit for generating a test pattern for testing external devices such as a write strategy control (WSC) device and an optical pick-up device, in response to a test enabling signal.

4. The apparatus of claim 1, further comprising a test pattern generation unit for generating a test pattern for testing external devices such as a write strategy control (WSC) device and an optical pick-up device, in response to a test enabling signal.

5. The apparatus of claim 1, wherein the data fetch and sync code generation unit generates sync codes and the EFMplus conversion unit comprises:
   a first code conversion unit for converting the 8-bit data words into the M-bit first code words;
   a digital sum value (DSV) and runlength limits (RLL) controller for receiving the sync codes and the converted first code words and checking the DSV and the RLL; and
   a second code conversion unit for converting output code words of the DSV and RLL controller into the 16-bit second code words in response to the sync codes.

6. The apparatus of claim 5, wherein the data fetch and sync code generation unit operates during a first cycle of an operating clock signal which is obtained by dividing a predetermined write clock signal by four, the first code conversion unit operates during a second cycle of the operating clock signal, the DSV and RLL controller operates during a third cycle of the operating clock signal, and the second code conversion unit and the NRZI conversion unit operate during a fourth cycle of the operating clock signal.

7. The apparatus of claim 1, wherein the data fetch and sync code generation unit generates sync codes and performs an operation for generating first sync codes in parallel.

8. A digital modulation method comprising the steps of:
   generating sync codes in response to recording field enabling signals;
   fetching 8-bit data words during a first cycle of an operating clock signal while first sync codes of the sync codes are generated, in response to the recording field enabling signals;
   converting the fetched data words into M-bit first code words during a second cycle of the operating clock signal;
   checking a digital sum value (DSV) and runlength limits (RLL) for the converted first code words during a third cycle of the operating clock signal; and
   converting the checked first code words into 16-bit second code words and converting the converted second code words into a non-return-to-zero inverted (NRZI) signal during a fourth cycle of the operating clock signal.

9. The method of claim 8, before generating sync codes, further comprising the steps of:
   generating the operating clock signal which is obtained by dividing a write clock signal by four;
   generating a mode selection signal for selecting one from a DVD-RAM operation mode and a DVD-R/RW operation mode in response to a control signal; and
   selectively generating recording field enabling signals related to a DVD-RAM in response to the start signal and the mode selection signal,
   or selectively generating recording field enabling signals related to a DVD-R/RW in response to the start signal and the mode selection signal.

* * * * *